Patented June 3, 1947

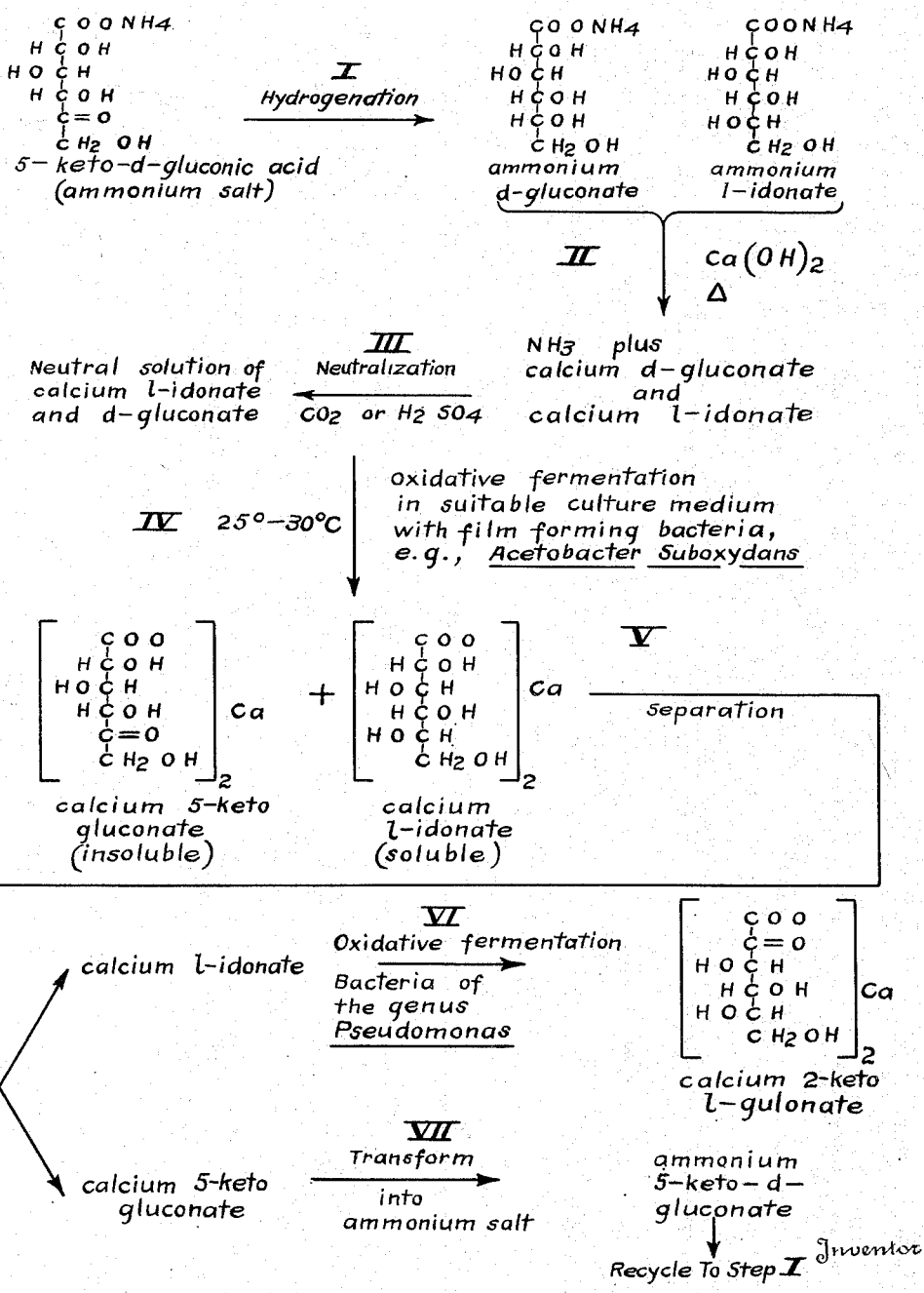

2,421,611

UNITED STATES PATENT OFFICE 2,421,611

PREPARATION OF 2-KETO GULONIC ACID AND ITS SALTS

Byron E. Gray, Alton, Ill.

Application May 4, 1945, Serial No. 591,878

4 Claims. (Cl. 195—47)

This invention relates to a new and improved method for the manufacture of 2-keto gulonic acid, also called l-xylo-2-keto hexonic or 2-keto l-idonic acid.

It is well known in the art that 2-keto-l-gulonic acid, or its esters, serves as a final intermediate for the manufacture of the physiologically important l-ascorbic acid, better known as synthetic vitamin C.

The established conventional process for producing 2-keto-l-gulonic acid is rather complicated, consisting of reduction of d-glucose to sorbitol, bacterial oxidation of sorbitol to sorbose, formation of di-acetone sorbose, oxidation of di-acetone sorbose to di-acetone 2-keto-l-gulonic acid, and hydrolysis of di-acetone 2-keto-l-gulonic acid to give l-xylo 2-keto hexonic acid. (Reichstein and Gruessner, Helv. Chim. Acta, 17:311, 1934.)

A principal object of this invention is the provision of a new method for the preparation of 2-keto-l-gulonic acid or its salts. A further object is the provision of a new procedure for the production of 2-keto-l-gulonic acid or its salts from l-idonic acid and its salts. Still further objects include the provision of a new procedure for the production of vitamin C intermediate from d-glucose and, in turn, 5-keto-d-gluconic acid with a high degree of efficiency and resulting good yields and the provision of a new method for the production of l-idonic acid from 5-keto d-gluconic acid by hydrogenation. Further objects and the entire scope of applicability of this invention will become apparent from the detailed description given hereinafter.

These objects are accomplished according to the process of my invention by hydrogenating the ammonium salt of 5-keto gluconic acid to obtain a mixture of ammonium d-gluconate and ammonium l-idonate, converting the said mixture into the corresponding calcium salts of l-idonic acid and d-gluconic acid, eliminating the calcium salt of d-gluconic acid from the mixture by oxidative fermentation as the insoluble calcium salt of 5-keto gluconic acid, and finally converting the resultant remaining l-idonic acid or its salts by oxidative fermentation into 2-keto-l-gulonic acid (2-keto l-idonic) or its salts.

DISCUSSION OF THE PROCESS

Reference is made to the attached drawing, which constitutes an abbreviated flow-sheet of my process, in order to aid in a clearer under- (a) *Preparation of l-idonic acid and/or its salts*

It is known that 5-keto gluconic acid may be easily produced from the readily available d-glucose (corn sugar) either by chemical oxidation (Kiliani, Berichte, 55B:2817, 1922) or by oxidative fermentation. (Boutroux, Compt. rend., 102:924 and 111:185; Stubbs et al., Ind. and Eng. Chem. 32:1626, 1940.) The 5-keto gluconic acid is usually isolated as the almost insoluble calcium salt, containing 2½ molecules of water of crystallization.

It has been found that the calcium salt of d-gluconic acid may be converted by oxidative fermentation to the almost insoluble calcium salt of 5-keto gluconic acid. (Stubbs et al., Ind. and Eng. Chem., 32:1626, 1940.) Said oxidative fermentation does not affect the salts of l-idonic acid.

It is also known that the calcium salt of 5-keto gluconic acid may be hydrogenated in the presence of a suitable catalyst to give a mixture of calcium l-idonate and calcium d-gluconate. (Pasternack and Brown, U. S. Patent 2,168,878.)

I have now found that the ammonium (as well as the alkali metal salts, e. g. potassium and sodium) salt of said 5-keto gluconic acid is capable of hydrogenation in a manner similar to the calcium salt, but hydrogenation is easier and lower pressures or temperatures may be used if desired with these more soluble salts.

The mixture of ammonium salts of l-idonic acid and d-gluconic acid resulting from said hydrogenation of the ammonium salt of 5-keto gluconic acid (step I) is treated with lime (calcium hydroxide) and heated, which drives the ammonia off and gives a mixture of the calcium salts of l-idonic and d-gluconic acid (step II). Excess calcium hydroxide in said mixture is suitably neutralized (step III), for example with carbon dioxide or sulfuric acid, and the resultant calcium carbonate or sulfate filtered off, leaving a neutral solution of calcium l-idonate and d-gluconate.

To this solution is now added d-glucose (corn sugar), suitable nutrients, and a buffering agent, such as calcium carbonate, and the resultant culture liquid is fermented (step IV) with bacteria of the Acetobacter group (or other film forming bacteria). Such fermentation may be done either by the shallow pan surface growth method, without aeration, or by submerged growth, maintaining the culture liquid in a high state of agitation, with simultaneous introduction pheric or superatmospheric pressure. Yields and rate of oxidative fermentation are increased by the latter method. The culture medium may be kept at various temperatures, but the best range is 25–30° C.

When oxidative fermentation is complete, the calcium d-gluconate, together with most of the d-glucose not consumed by the bacteria, will be found to have been converted to calcium 5-keto gluconate. Said calcium 5-keto gluconate, being almost insoluble, may be filtered off, leaving the unchanged calcium l-idonate in solution (step V). The calcium 5-keto gluconate thus obtained as a by-product may be used as a raw material for the ammonium 5-keto gluconate in the previously described hydrogenation (step VII).

(b) *Preparation of 2-keto-l-gulonic acid (l-xylo-2-keto hexonic) and/or its salts*

It has been found that certain bacteria of the Pseudomonas group have the power to oxidize glucose or gluconic acid to the corresponding 2-keto acid. (Lockwood et al., Journal of Bacteriology, 42:51, 1941.)

I have now found, that the same type of bacteria has the power to oxidize idonic acid. Such bacteria have the power to produce enzymes capable of oxidizing the l-idonic acid, but cannot well assimilate the acids. However, if a salt (for example, calcium or other non-poisonous soluble salt) of l-idonic acid is oxidatively fermented by a member of the Pseudomonas species in the presence of a small amount of suitable substrate, such as maltose or glucose, there is formed the corresponding salt of 2-keto-l-gulonic acid (step VI). The substrate permits the bacteria to grow and produce enzymes which are capable of oxidizing the l-idonic acid or its salt to the corresponding 2-keto acid.

Such oxidative fermentation of the above-described culture solution is carried out by the submerged growth method, maintaining the solution in a high state of agitation, with simultaneous introduction of large quantities of air, or other gas containing substantial quantities of oxygen, either under atmospheric and preferably, super-atmospheric pressure. Yields and rate of fermentation are increased by super-atmospheric pressure. Temperature of culture medium may be varied, but is best kept in the range of 25–30° C.

When oxidative action is complete, the culture solution is clarified, filtered, concentrated under reduced pressure and cooled, whereupon the calcium salt of 2-keto-l-gulonic acid crystallizes and is filtered off. Alternately, the salt may be precipitated from the cool concentrated solution with alcohol. The calcium 2-keto-l-gulonate is easily changed into the free acid by treatment with sulfuric acid, or may be converted directly into an ester by treatment with acid in anhydrous alcohol solution.

The operation of my process may be fully comprehended from the following illustrative example in which all parts are by weight unless otherwise specified:

A suspension of 172 parts of calcium 5-keto gluconate. 2½ $H_2O$ is prepared by incorporating the salt in 2000 parts of distilled water. The suspension is cooled to 20° C. and sulfuric acid carefully added with agitation until all the 5-keto gluconic acid is set free. The temperature is kept at 20° C. or below during the addition of acid by suitable cooling.

The mixture is next carefully neutralized to litmus with ammonia, gaseous or aqua. It is then heated to 50° C. and filtered. The pH of the filtered solution is adjusted to 8.0–8.4, and to it are added 25 parts of Raney nickel catalyst and the mixture is placed in an agitated autoclave and heated at 60° C. under a hydrogen pressure of 100 atmospheres. Progress of hydrogenation may be followed by testing with Fehling's solution. When hydrogenation is complete there is an absence of substances capable of reducing Fehling's solution. Ordinarily, the hydrogenation will take about four to six hours.

When hydrogenation is complete, the pressure is released and the catalyst is filtered off. The catalyst may be reused if the hydrogen used was pure; if not, it may be regenerated. The filtrate is treated with 75 parts of hydrated lime and heated until substantially all the ammonia has been driven off. The mixture is then cooled and neutralized with carbon dioxide, a little activated carbon is added, the solution is filtered and concentrated to 1000 parts.

To the filtered and clarified solution are added 75 parts glucose, 6 parts corn steeping liquor, and 0.3 part octadecyl alcohol, and the pH is adjusted to 6.0 plus or minus 0.1. The solution is now placed in a suitable vessel equipped with a distributor inlet for sterile air consisting of an Alundum ball. The vessel also has an air outlet, and a sample withdrawal outlet. The solution is sterilized by heating at 15 lbs. steam pressure for 15 minutes, cooled, and 17 parts calcium carbonate (sterilized separately) are added. The solution is then inoculated with 50 parts of a 48 hour culture of *Acetobacter suboxydans* grown on a 5 per cent sorbitol–0.5 per cent yeast extract liquid tube culture, and the inoculated culture medium is agitated vigorously with sterile air for a period of 8 days.

After the fermentation is complete, the precipitated calcium 5-keto gluconate is filtered off. About 175 parts are obtained, which is recycled as raw material for further production.

The filtrate contains calcium l-idonate together with a trace of calcium 5-keto gluconate. It is now placed in a fermentation vessel equipped with a distributor inlet for sterile air consisting of an Alundum ball. The vessel has an outlet for air and a sample withdrawal tube.

To the solution are now added 3 parts maltose (or glucose), 3 parts corn steeping liquor, 0.3 part $KH_2PO_4$, and 0.1 part $MgSO_4.7H_2O$. The pH is then adjusted to 5.5–6.0 The culture solution is then sterilized at 15 lbs. steam pressure for one half hour.

The sterile culture solution is next inoculated with 50 parts of a 5 per cent glucose–0.5 per cent yeast extract liquid tube culture of *Pseudomonas mildenbergii*. The solution is then vigorously agitated with sterile air for 10 days.

When the fermentation is complete, the solution is clarified with activated carbon, filtered, concentrated under reduced pressure, and cooled. Two volumes of ethyl alcohol are added and the precipitated calcium 2-keto-l-gulonate is filtered off and dried. Yield is 45 parts, or roughly 50% of the glucose charged.

I claim:

1. The process for the production of a material from the group consisting of 2-keto gulonic acid and its calcium salt which comprises oxidative fermentation of a substance from the group consisting of idonic acid and calcium idonate in the presence of the bacteria *Pseudomonas mildenbergii*.

2. The process for the production of a material from the group consisting of 2-keto gulonic acid and its calcium salt which comprises inoculating an aqueous nutrient medium comprising a substance from the group consisting of idonic acid and calcium idonate in the presence of the bacteria *Pseudomonas mildenbergii*, and agitating and aerating the solution.

3. The process of claim 2, wherein the inoculated solution is maintained under super-atmospheric pressure of up to 100 atmospheres of gases containing substantial quantities of oxygen.

4. The process of claim 1, wherein fermentation is conducted by cultivating the bacteria in a submerged state.

BYRON E. GRAY.

REFERENCES CITED

The following references are of record in the file of this patent:

UNITED STATES PATENTS

| Number | Name | Date |
|---|---|---|
| 2,168,878 | Pasternack and Brown | Aug. 8, 1939 |
| 2,318,641 | Stubbs et al. | May 11, 1943 |

OTHER REFERENCES

Lockwood, J. of Bact. 42, 51 (1941).
Stubbs et al., Ind. Eng. Chem. 32, 1626 (1940).